(12) United States Patent
Allender-Zivic (10) Patent No.: US 11,268,633 B2
(45) Date of Patent: Mar. 8, 2022

(54) CABLE MANAGEMENT DEVICE AND ASSOCIATED SYSTEM AND METHODS

(71) Applicant: Cable Munkey, LLC, Vermillion, SD (US)

(72) Inventor: Jonathan Allender-Zivic, Vermillion, SD (US)

(*) Notice: Subject to any disclaimer, the term of this patent is extended or adjusted under 35 U.S.C. 154(b) by 0 days.

(21) Appl. No.: 16/506,469

(22) Filed: Jul. 9, 2019

(65) Prior Publication Data

US 2020/0011453 A1 Jan. 9, 2020

Related U.S. Application Data (60) Provisional application No. 62/695,449, filed on Jul. 9, 2018.

(51) Int. Cl.
*F16L 3/06* (2006.01)
*H02G 3/04* (2006.01)

(52) U.S. Cl.
CPC .............. *F16L 3/06* (2013.01); *H02G 3/0456* (2013.01)

(58) Field of Classification Search
CPC ..... A62B 35/0075; F16L 3/06; H02G 3/0456; F16B 45/00
USPC ............ 248/690, 691, 692, 617, 100, 290.1, 248/294.1, 301, 322, 339; 24/599.1, 24/599.2, 599.4, 599.5, 599, 6, 600.1, 24/600.2
See application file for complete search history.

(56) References Cited

U.S. PATENT DOCUMENTS

| | | | | |
|---|---|---|---|---|
| 1,814,900 A | * | 7/1931 | Deppe | F16B 45/02 294/82.21 |
| 1,826,564 A | * | 10/1931 | Mix | F16B 45/00 24/598.8 |
| 2,284,197 A | * | 5/1942 | Greene | F16B 45/00 294/82.17 |
| 4,835,823 A | * | 6/1989 | Contat | F16B 45/02 24/582.11 |
| 7,516,930 B2 | * | 4/2009 | Chen | F16B 7/0433 248/304 |
| 9,121,437 B1 | * | 9/2015 | Carnicle | F16B 45/02 |
| 2003/0025056 A1 | * | 2/2003 | Atchley | B25B 9/00 248/304 |
| 2018/0135729 A1 | * | 5/2018 | Shen | A47J 45/02 |

* cited by examiner

*Primary Examiner* — Muhammad Ijaz
(74) *Attorney, Agent, or Firm* — Dentons Davis Brown; Matthew Warner-Blankenship (57) ABSTRACT

The disclosure is related to cable management devices and associated systems and methods. The cradle has an elongate body having at least a first end and a second end. The first end of the cradle defining an elongate securement lumen constructed and arranged to grasp a support structure. The cradle may also have a first curved portion and second curved portion defining a first major sector lumen and a second major sector lumen each securement lumen constructed and arranged to support various cables and wires.

20 Claims, 11 Drawing Sheets

CABLE MANAGEMENT DEVICE AND ASSOCIATED SYSTEM AND METHODS

CROSS-REFERENCE TO RELATED APPLICATION(S)

This application claims the benefit under 35 U.S.C. § 119(e) to U.S. Provisional Application 62/695,449, filed Jul. 9, 2018, and entitled "Theatrical Cable Management and Support Device and System," which is hereby incorporated herein by reference in its entirety for all purposes.

TECHNICAL FIELD

This disclosure relates to cable management devices and associated systems and methods. More particularly to devices for supporting, managing, and organizing cables and other items that are suspended from various support structures.

BACKGROUND

The present disclosure relates to devices for supporting and managing wires, cables, and other items that are suspended from various support structures.

Theaters require the use of various lighting, audio, and other systems for performances. These systems and their peripheral components often require numerous wires, cables, and other items to function properly. The various components of these systems frequently must be suspended above the stage along a batten, truss, or other support structure. Any excess wire and/or cable along the support structure must be secured such that the excess wire and/or cable does not simply hang from the support structure.

Previously, 'tie line' and/or tape has been used to secure excess cables and wires to the support structures. The use of 'tie line' can be cumbersome, requiring that a user individually tie each cable or wire to the support structure, often at multiple points, and ensure that the tie is secure. The use of tape is also cumbersome, requiring lots of tape to be used. Additionally, tape leaves behind adhesive residue which must be cleaned from the support structure after removal.

A theatrical batten or truss may extend horizontally above a stage, generally from stage left to stage right. Cables and wires along such a batten or truss must be properly secured such that the stage is not obscured by loose wires. Additionally, properly securing cables and wires is necessary for the safety of performers and stage workers as well as the proper maintenance of connected systems.

There is a need in the art for improved devices, systems and methods for supporting cables, wires, and other items on various support structures.

BRIEF SUMMARY

Disclosed herein are various devices and associated systems and methods for supporting and managing cables, wire, and other items along various support structures.

In one example a cable management device, including: an elongate body having a first end and a second end, the first end defining an elongate securement lumen; a first curved member disposed at the second end of the elongate body defining a first major sector lumen; and a second curved member intermediate of the first and the second end of the elongate body defining a second major sector lumen.

Implementations may include one or more of the following features. The device where the device is included of plastic. The device further including at least one aperture defined within the elongate body. The device where the elongate securement lumen has a diameter of about 1⅞ inches. The device where the device is about 7¼ inches long and 6⅛ inches deep. The device where the first curved member has a diameter of about 3 inches. The device where the second major sector lumen has a diameter of about 1½ inches.

In another example a cable management system, including: a body having a first end and a second end; an elongate securement lumen disposed at and defined by the first end of the body; a first curved portion disposed at the second end of the body constructed and arranged to support a first cable; and a second curved portion disposed between the first end and the second end of the body constructed and arranged to support a second cable.

Implementations may include one or more of the following features. The system where the first cable is an electrical cable or a data cable. The system where the second cable is a data cable or an electrical cable. The system where the first cable does not cause interference with the second cable. The system where the device is secured to a support structure. The system where the support structure is a theatrical batten.

In another example a cable support system including: an elongate body, an elongate securement lumen defined by the elongate body constructed and arranged to operatively couple a support structure, a first curved member defining a first major sector lumen, and a second curved member defining a second major sector lumen.

Implementations may include one or more of the following features. The device where the first major sector lumen has a first diameter and the second major sector lumen has a second diameter and the first diameter is greater than the second diameter. The device where the first diameter is about 1.5 to 3 times larger than the second diameter. The device where the elongate securement lumen has a third diameter and an opening where the opening is smaller than the third diameter. The device further including at least one aperture defined within the body. The device further including at least two apertures within the body. The device where the body is plastic.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The various implementations shown in FIGS. 1-10H and otherwise disclosed herein relate to a cradle 10 for supporting, securing, and managing cables, wires, and other items that are constructed and arranged to be suspended from a support structure. In various implementations, the cables, wires, and other items used with the cradle 10 may be the cables, wires, and peripheral devices of various audio and lighting systems of a theater and those understood to be equivalent by those of skill in the art. Of course other applications are possible.

In various implementations, the cradle comprises one or more components. Various implementations of the cradle relate to the devices, systems, methods and articles of manufacture relating to the various cradle components. Various other implementations of the cradle are shown and described in U.S. Design application 29/697,493, which is hereby incorporated by reference in its entirety for all purposes.

In certain implementations, the support structures from which the cables and wires are suspended by the cradle 10 are theatrical battens and/or trusses. Further support structures understood in the theatrical arts are also readily understood to be contemplated. Still further support structures similar and equivalent to battens and trusses are also contemplated, whether or not in the theatrical arts.

Additionally, the cradle 10 according to certain implementations is structured, sized and shaped such that various different types of wires/cables can be supported and secured separately. It would be appreciated by those of skill in the art that cables that conduct electricity can generate electrical fields that can interfere with the transmission of data signals along various other cables/wires. It is therefore desirable that electrical and data cables—while disposed along the same support structure—are separated such that an electrical cable does not create interference with a data cable. Moreover, separation of the various cables and wires can allow for faster set up and taken down of the various lighting, audio, or other systems along the support structure.

Figure 1:
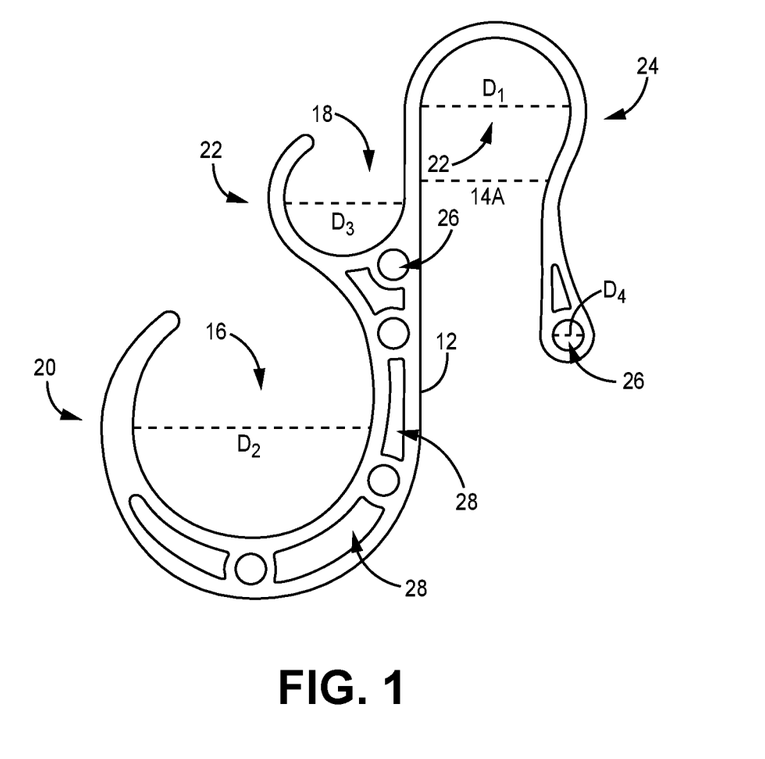
FIG. 1 is a side view of the cradle, according to one implementation.
Figure 2:
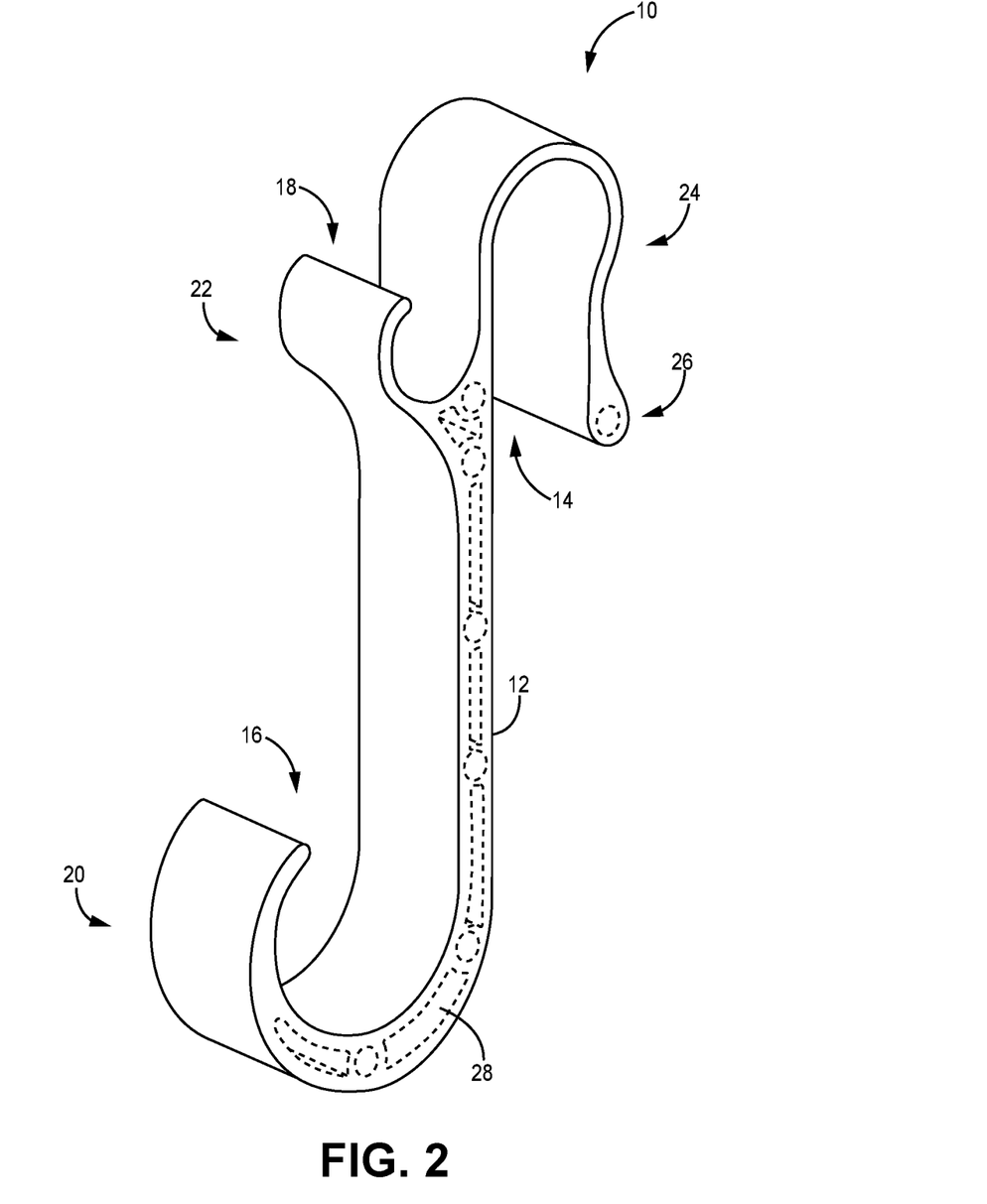
FIG. 2 is a perspective view of the cradle, according to one implementation.
Figure 3:
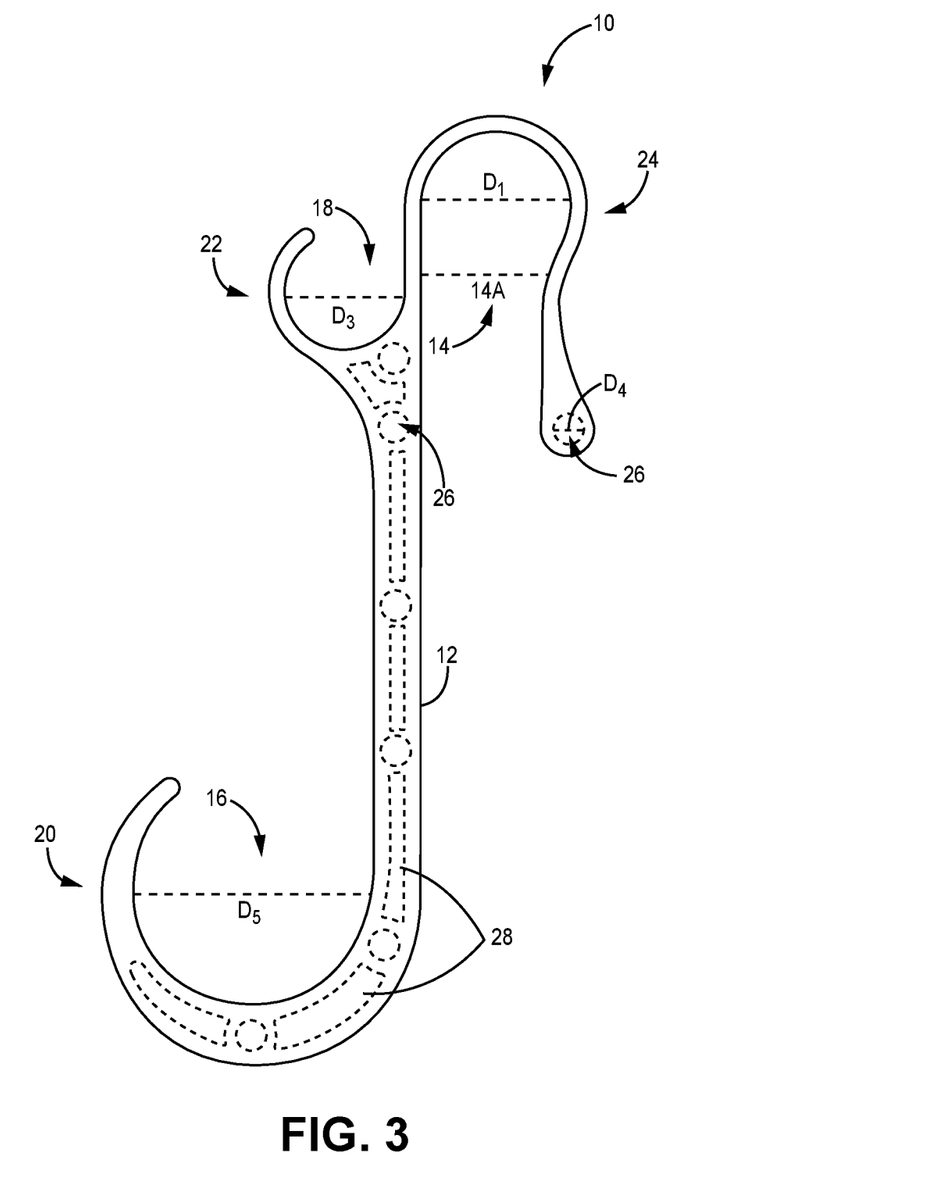
FIG. 3 is a side view of the cradle, according to one implementation.
Figure 4:
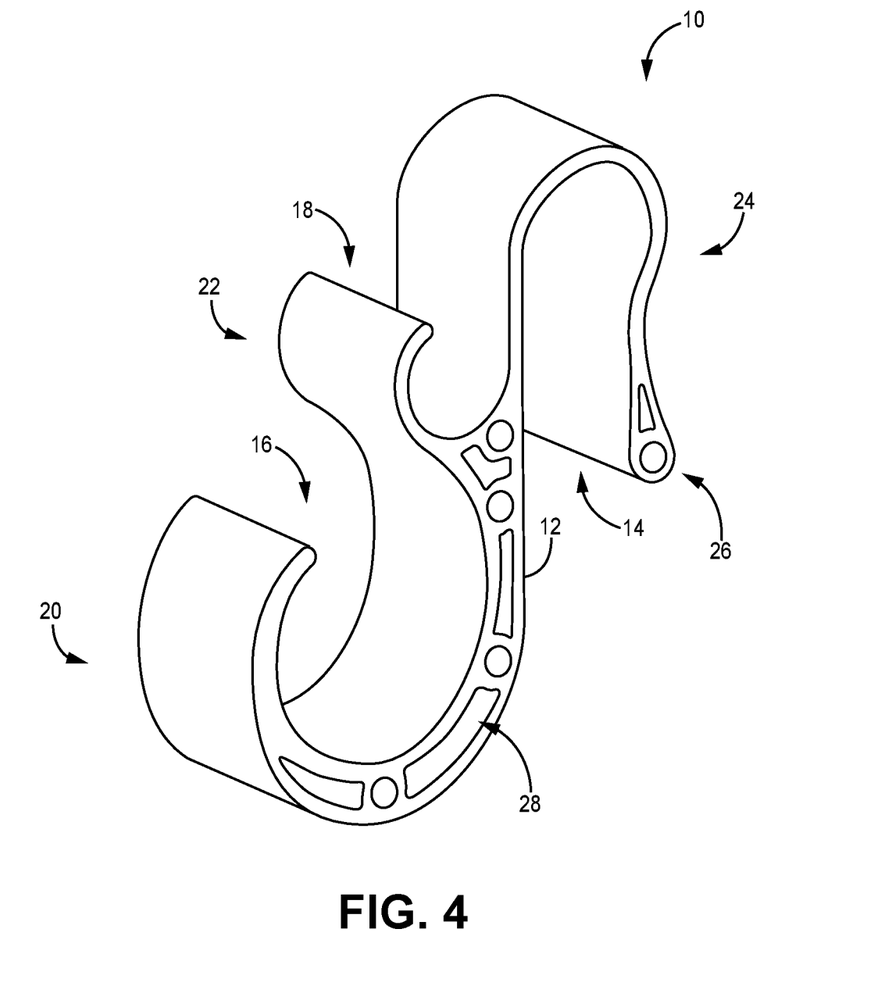
FIG. 4 is a perspective view of the cradle, according to one implementation.
Figure 5:
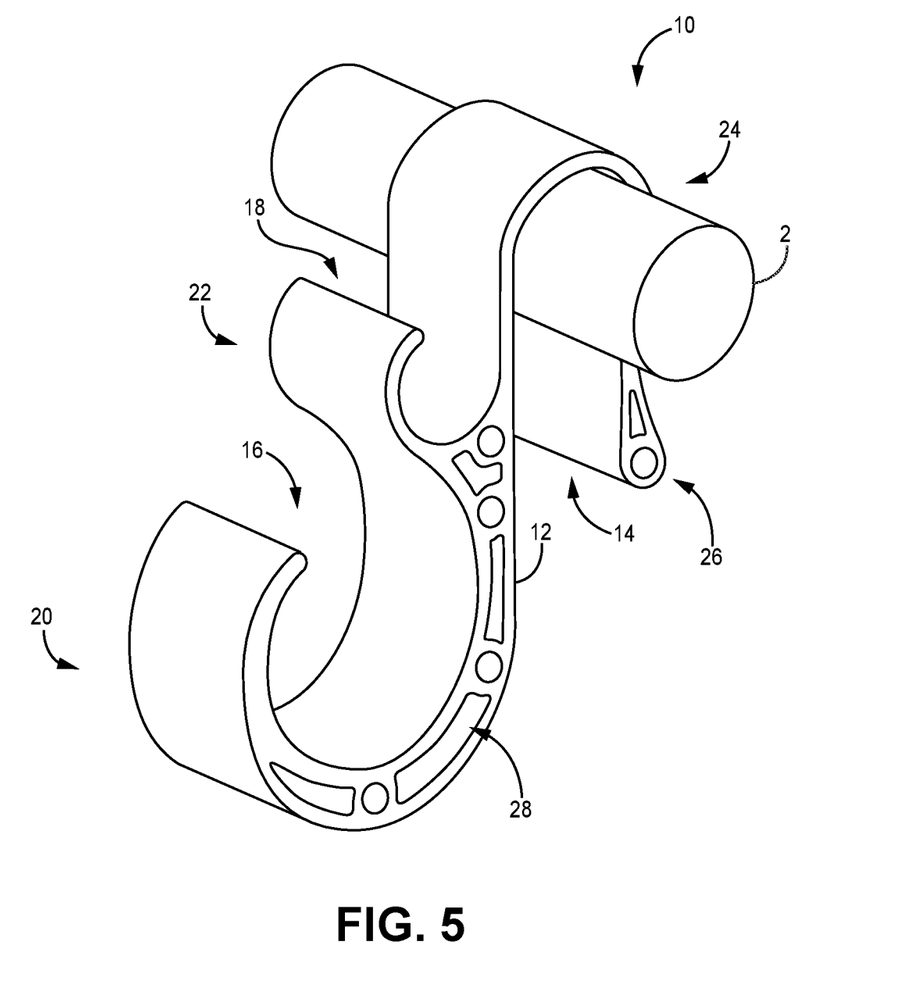
FIG. 5 is a perspective view of the cradle and support structure, according to one implementation.
Figure 6:
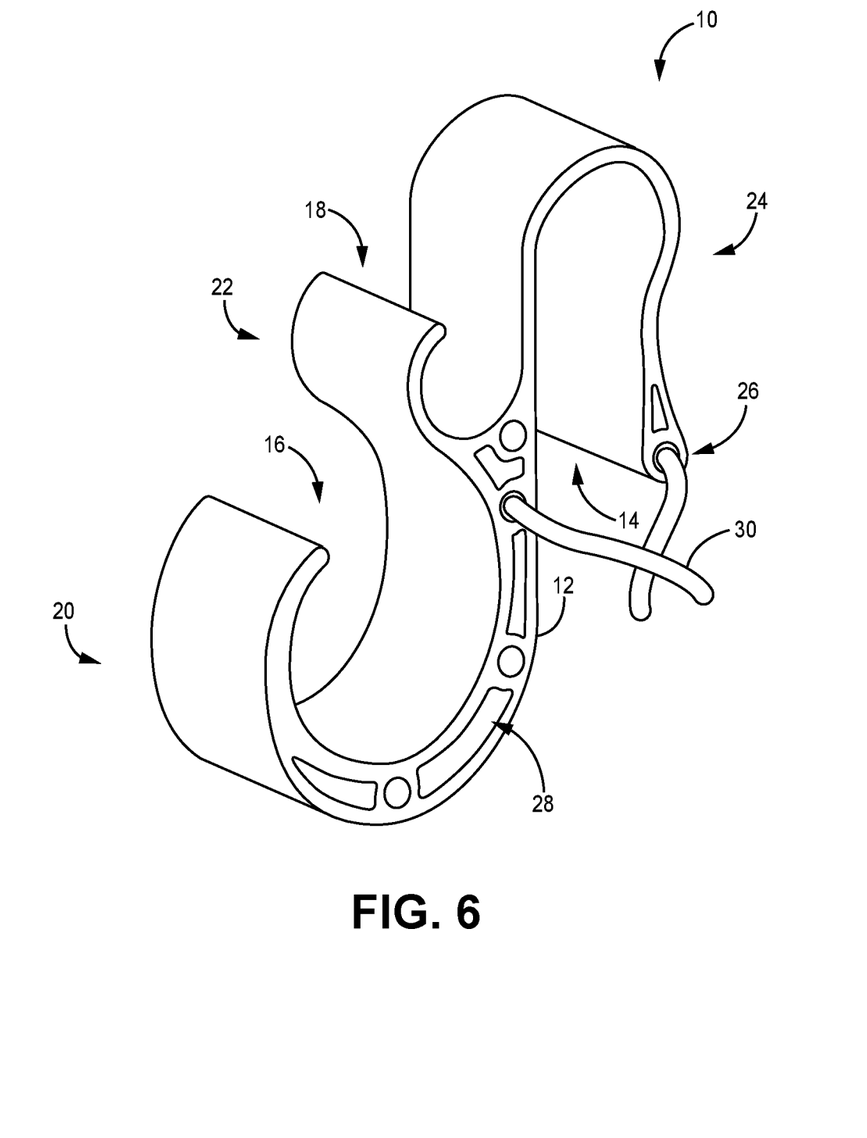
FIG. 6 is a perspective view of the cradle and associated securing tie, according to one implementation.

FIGS. 1 and 4-6 depict the cradle 10 according to one implementation, with FIG. 1 depicting a side view of the cradle 10, FIG. 4 depicting a perspective view of the cradle 10, FIG. 5 depicting a perspective view of the cradle 10 engaged with a support structure 2, and FIG. 6 depicting a perspective view of the cradle 10 with a securing tie 30. FIGS. 2-3 depict the cradle 10 according to another exemplary implementation, with FIG. 2 depicting a perspective view of the cradle 10 and FIG. 3 depicting a side view of the cradle 10.

As shown in FIG. 2, in certain implementations the cradle 10 elongate body 12 and various components have a length (shown at reference arrow L), width (shown at reference arrow W) and thickness (shown at reference arrow T).

The cradle 10 has an elongate body 12, according to some implementations. The body 12 may be generally S-shaped or curved. The cradle 10 may also have various contours defining a plurality of lumens 14, 16, 18. As shown for example in FIG. 2 and elsewhere, the width W of the elongate body 12 exceeds the thickness T throughout the body 12 and plurality of lumens 14, 16, 18. That is, in various implementations, the width W exceeds the thickness T by about 2 times or more. In these and other implementations, the width W is such that cables or wires supported by the cradle 10 rest within the lumens 16, 18 without crimping, bending, or creasing such that performance or integrity of the cables/wires are compromised.

The cradle 10, according to some implementations, is made from moldable plastic or another suitable material that is strong, durable, impact resistant, and has a resilient flexibility. In various alternative implementations, the cradle 10 is made from metal. In one example, the metal may be a high weight rated aluminum. In some implementations, the cradle 10 is made from a single, integral piece of material. In various other implementations, the cradle 10 is modular.

In some implementations, and as shown for example in FIGS. 1-6, the cradle body 12 may have a first end 24 defining an elongate securement lumen 14. At the second end of the cradle 10, the body 12 may have a first curved member 20 defining a first major sector lumen 16. Intermediate of the first end 24 and the first curved member 20, the body 12 may have a second curved member 22 defining a second major sector lumen 18.

The elongate securement lumen 14 at the first end 24 of the body 12 is configured to be engaged with a support structure 2. The first end 24 may engage the support structure 2 by extending partially around the support structure 2. In various implementations, the elongate securement lumen 14 is constructed and arranged such that the cradle 10 may be quickly, securely, and easily engaged with the support structure 2. The elongate securement lumen 14 of the cradle 10 is structured, sized and shaped such that the first end 24 may be secured around a support structure 2, such that the cradle 10 will not inadvertently disengage from the support structure 2.

In use, when the cradle 10 is placed along the support structure 2, the first end 24 grasps the support structure 2, such that the cradle 10 is secured around the support structure 2. In some implementations, the cradle 10 is held in place around the support structure 2 via frictional forces.

In various implementations, the first end 24 of the body 12 may be curved such that the opening 14A of the elongate securement lumen 14 is smaller than the diameter ($D_1$) of the elongate securement lumen 14. In these and other implementations, when the cradle 10 is engaged with a support structure 2 the cradle 10 has a reduced ability to be disengaged from the support structure 2.

In various implementations, the first major sector lumen 16 is defined by the first curved member 20 and is constructed and arranged to receive and secure various cables, wires, and/or other items. The first curved portion may be disposed at the second end of the body 12. In certain implementations, the first curved member 20 extends in the opposite direction of the elongate securement lumen 14.

In some implementations, the second major sector lumen 18 is defined by the second curved member 22 and is constructed and arranged to receive and secure various cables, wires, and/or other items. The second curved member 22 may be disposed between the first end 24 and the first curved member 20. The second curved member 22 may be spaced away from the first curved member 20 such that when both curved members 20, 22 are supporting cables 4, 6 (as shown, for example, in FIGS. 6 and 7) the cables 4, 6 will not cause interference with each other.

In some implementations, the second curved member 22 extends in the same direction as the first curved member 20, opposite the elongate securement lumen 14. One of skill in the art would appreciate that other configurations are of course possible.

In various implementations, the body 12 of the cradle 10 may be solid. In various alternative embodiments, the body 12 of the device may include various apertures 26 and/or voids 28. The voids 28 may be provided within the body 12 in order to decrease the weight of the cradle 10, provide to enhanced flexibility, and/or increase ease of manufacturing. The apertures 26 may be placed at various points within the body 12 to allow for securing ties 30 to be passed through.

As best shown in FIG. 6 a securing tie 30, or cord 30, may be threaded through apertures 26 and the tied such that the securing tie 30 will secure and hold the cradle 10 to a support structure 2. The use of the cradle 10 with a securing tie 30 may provide extra security, such that if the first end 24 of the cradle 10 were to inadvertently disengage from a support structure 2 the cradle 10 would not fall off the support structure 2. In one example, a securing tie 30 may be used when the support structure 2 is being moved.

The various lumens 14, 16, 18 of the cradle 10 and the cradle 10 itself may be configured to fit a particular application, as will be discussed further below. The elongate securement lumen 14 may have various sizes and shapes to fit the particular support structure 2. The first major sector lumen 16 and second major sector lumen 18 may have various sizes and shapes to fit the various cables/wires 4, 6 or other items to be secured.

The length of the body 12 may vary depending on the application for the cradle 10. As stated above, the cradle may be constructed and arranged to space apart various cables that may generate electrical fields and cause interference with each other. For example, in FIGS. 2 and 3 the body 12 is longer than the body 12 shown in FIG. 1, thereby increasing the distance between the first major sector lumen 16 and second major sector lumen 18. As such, a cable or wire that generates a large electrical field may be secured within the first major sector lumen 18 and not interfere with the cable secured within the second major sector lumen 18 or vice versa.

In some implementations, the first major sector lumen 16 is larger than the second major sector lumen 18. In various of these implementations, the first major sector lumen 16 is 1.5-3 times larger than the second major sector lumen 18.

In one specific example, shown in FIG. 1, the cradle 10 is approximately 7¼ inches long and 6⅛ inches in depth. The elongate securement lumen 14 may have a diameter ($D_1$) of about 1⅞ inches, first major sector lumen 16 may have a diameter ($D_2$) of about 3 inches, and the second major sector lumen 18 may have a diameter ($D_3$) of about 1½ inches. In this specific example, the apertures 26 may have a diameter ($D_4$) of about ⅜ inch. These measurements are given for illustrative purposes only and are not to be construed as limiting.

In another specific example, as shown in FIG. 3, the cradle 10 is approximately 11¼ inches long and 6⅛ inches in depth. In various of these implementations, the elongate securement lumen 14, first major sector lumen 16, second major sector lumen 18, and apertures 26 have the same dimensions as the example above. In some implementations, the first major sector lumen 16 has a diameter ($D_5$) of 4⅗ inches. Of course, other dimensions and shapes are possible and would be recognized by those of skill in the art. The specific measurements above are given for illustrative purposes only and are not to be construed as limiting.

Figure 7:
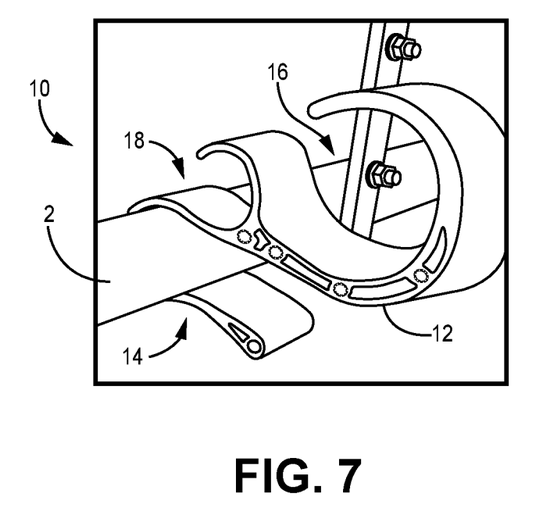
FIG. 7 is a perspective view of the cradle at an alternative angle, according to one implementation.

As shown in FIG. 7 the cradle 10 may be engaged with a support structure 2 and tilted to various angles. In some implementations, the cradle 10 may be attached to the support structure 2 such as to be substantially perpendicular to the ground. Alternatively, the cradle 10 may be rotated about the support structure 2 such as to be substantially parallel to the ground. The cradle 10 may disposed at any desired angle therebetween.

The various implementations of the cradle 10 disclosed and contemplated herein increase the ease and speed at which the various cables, wires, and other items can be safely and effectively suspended from a support structure. The cradle 10 can easily grasp a support structure 2 and the cables 4, 6, wires 4, 6, and other items are then supported by the various curved members 20, 22 of the cradle 10, as discussed above.

Figure 8:
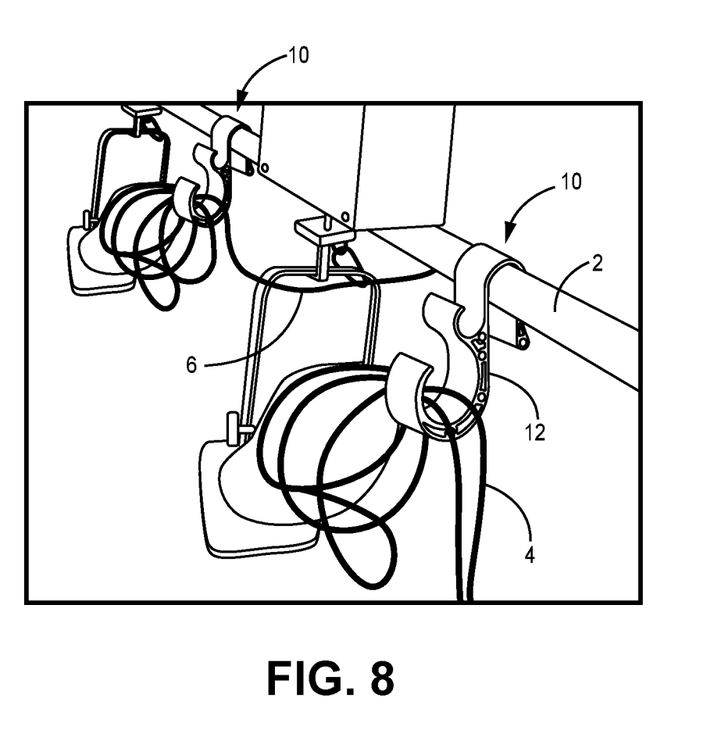
FIG. 8 is a perspective view of the cradle in use, according to one implementation.

FIG. 8 depicts the cradle 10 in use along a theatrical batten 2. The cradle 10 is secured on the batten 2, such that the elongate securement lumen 14 is fitted around the batten 2 in a secure manner. An electrical cable 4, or other type of cable 4 is secured within the first major sector lumen 16 and supported by the first curved member 20. A second cable 6, such as a data cable 6 is secured within the second major sector lumen 18 and supported by the second curved member 22.

A plurality of cradles 10 may be disposed along the length of the batten 2, supporting the various cables 4, 6. In various implementations, a cradle 10 is placed about every 3 to 4 feet along the support structure 2. Optionally, while the cradle 10 is in use, a securing tie 30 (shown in FIG. 6) may be threaded through the apertures 26 to secure the cradle 10 to the support structure 2.

Figure 9:
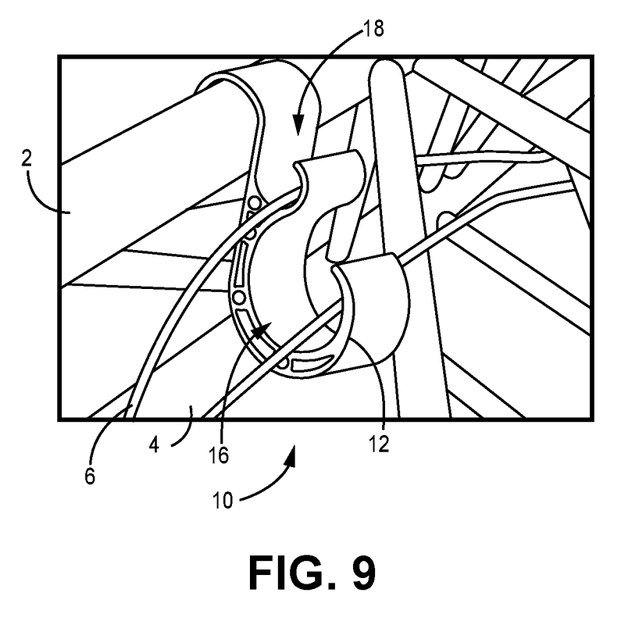
FIG. 9 is a perspective view of the cradle in use on a truss, according to one implementation.
Figure 10A:
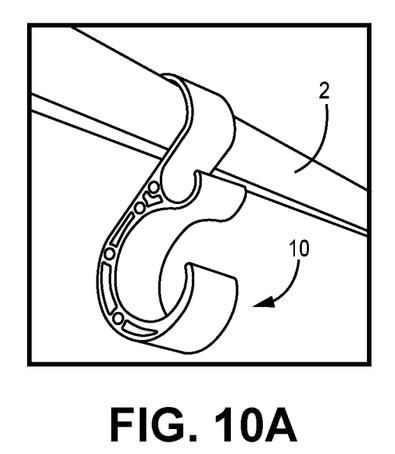
FIG. 10A is a perspective view of the cradle secured to a blackboard, according to one implementation.
Figure 10B:
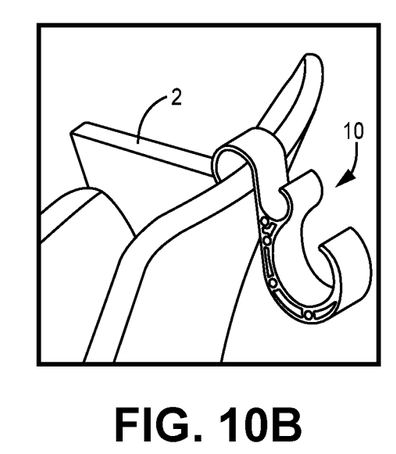
FIG. 10B is a perspective view of the cradle secured to a chair, according to one implementation.
Figure 10C:
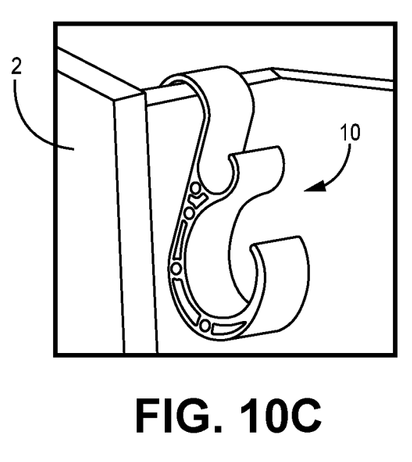
FIG. 10C is a perspective view of the cradle secured to a lectern, according to one implementation.
Figure 10D:
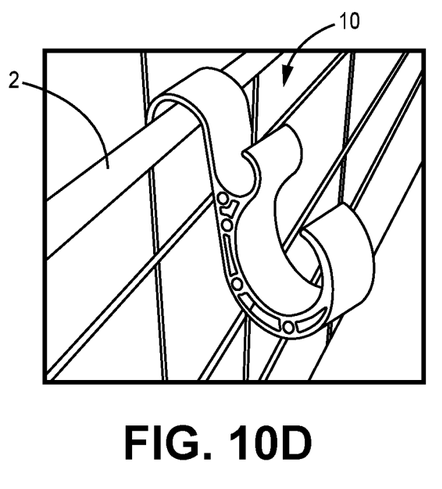
FIG. 10D is a perspective view of the cradle secured to a conduit, according to one implementation.
Figure 10E:
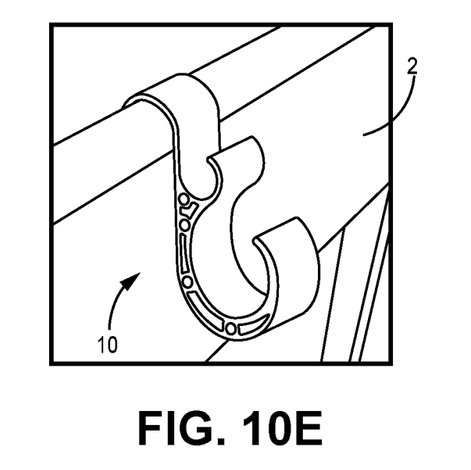
FIG. 10E is a perspective view of the cradle secured to a sink, according to one implementation.
Figure 10F:
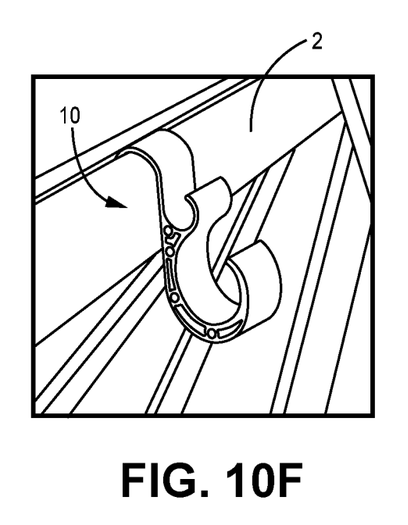
FIG. 10F is a perspective view of the cradle secured to a saw horse, according to one implementation.
Figure 10G:
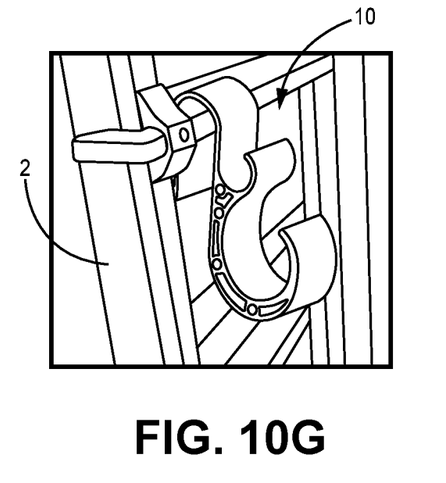
FIG. 10G is a perspective view of the cradle secured to a ladder, according to one implementation.
Figure 10H:
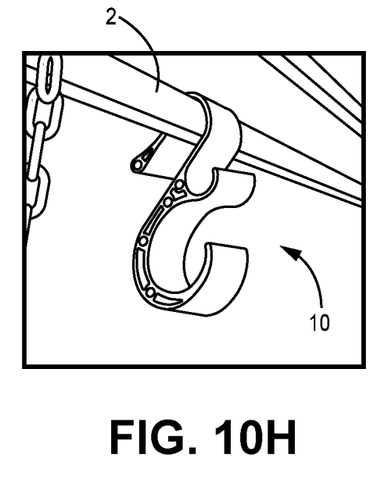
FIG. 10H is a perspective view of the cradle secured to a lift, according to one implementation.

FIG. 9 depicts the cradle 10 in use along a theatrical truss 2. A first cable 4 is supported by the first curved member 20 and a second cable 6 is supported by the second curved member 22.

The cradle 10, may be used in various other industries and with various alternative support structures 2, as shown in FIGS. 10A-H. The cradle 10 may be engaged with various support structures 2 including but not limited to a chalkboard, a chair or theater seat, a lectern, a conduit, a sink, a sawhorse, a ladder, a lift, and various other structures as would be appreciated by those of skill in the art. Various alternative support structures may include rafters and other structures in the field of construction. The shape and dimensions of the cradle 10 and its various components may be adjusted for each application with which the cradle 10 is to be used, as necessary.

Although the present disclosure has been described with references to various embodiments, persons skilled in the art will recognized that changes may be made in form and detail without departing from the spirit and scope of this disclosure.

What is claimed is:

1. A cable management device, comprising:
  a) an elongate body comprising:
    (i) a length defined by a first end and a second end;
    (ii) a width extending along a width axis; and
    (iii) a thickness extending along a thickness axis, wherein the width is greater than the thickness along the elongate body;
  b) a rear-facing elongate securement lumen disposed at the first end of the elongate body and defined by the width of the first end of the elongate body;
  c) a first curved member curved around an axis parallel to the width axis and perpendicular to the thickness axis, wherein the first curved member is disposed at the second end of the elongate body defining a first forward facing lumen, wherein the first forward facing lumen is further defined by the width of the second end of the elongate body; and
  d) a second curved member intermediate of the first and the second end of the elongate body defining a second lumen, wherein the second lumen is further defined by the width of the elongate body.

2. The device of claim 1, wherein the first forward facing lumen is a major sector lumen, and the device is comprised of plastic.

3. The device of claim 2, wherein the device is comprised of moldable or extruded plastic.

4. The device of claim 1, further comprising at least one aperture defined within the elongate body, the at least one aperture configured to receive a tie to create a loop.

5. The device of claim 1, wherein the width is about two or more times greater than the thickness.

6. A cable management system, comprising:
  a) a body comprising:
    (i) a first end and a second end;
    (ii) a width extending along a width axis; and
    (iii) a thickness extending along a thickness axis, wherein the width exceeds the thickness;
  b) a rear-facing elongate securement lumen disposed at the first end of the body and defined by the width of the first end of the body;
  c) a first curved portion curved around a first axis parallel to the width axis and perpendicular to the thickness axis, wherein the first curved portion is disposed at the second end of the body and configured to support a first cable; and
  d) a second curved portion curved around a second axis parallel to the width axis and perpendicular to the thickness axis, wherein the second curved portion is disposed between the first end and the second end of the body and configured to support a second cable.

7. The system of claim 6, wherein the first cable is an electrical cable or a data cable.

8. The system of claim 7, wherein the second cable is a data cable or an electrical cable.

9. The system of claim 8, wherein the first cable does not cause interference with the second cable.

10. The system of claim 6, wherein the device is configured to include a mounted configuration and an unmounted configuration, wherein in the unmounted configuration the rear-facing elongate securement lumen is empty, and wherein in the mounted configuration the device is secured to a support structure via the rear-facing elongate securement.

11. The system of claim 10, where the support structure is a theatrical batten.

12. The system of claim 6, wherein the width is about two or more times greater than the thickness.

13. A cable support system comprising:
  a) an elongate body comprising a length, a width extending along a width axis, and a thickness extending along a thickness axis, wherein the width exceeds the thickness;
  b) a rear-facing elongate securement lumen defined by the width of the elongate body, the rear-facing elongate securement lumen configured to operatively couple the support structure;
  c) a first curved member curved around a first axis parallel to the width axis and perpendicular to the thickness axis, wherein the first curved member defines a first lumen configured to support one or more cables or wires; and
  d) a second curved member curved around a second axis parallel to the width axis and perpendicular to the thickness axis, wherein the second curved member defines a second lumen configured to support one or more cables or wires,
  wherein the rear-facing elongate securement lumen is configured to extend around the support structure.

14. The system of claim 13, wherein the first lumen is a first major sector lumen and has a first diameter, and the second lumen is a second major sector lumen and has a second diameter and the first diameter is greater than the second diameter.

15. The system of claim 14, wherein the first diameter is about 1.5 to 3 times larger than the second diameter.

16. The system of claim 13, wherein the rear facing elongate securement lumen has a third diameter and an opening wherein the opening is smaller than the third diameter.

17. The system of claim 13, further comprising at least one aperture defined within the elongate body, the at least one aperture configured to accept a tie to create a loop.

18. The system of claim 13, further comprising at least two apertures within the elongate body, each of the at least two apertures configured to accept a tie.

19. The system of claim 18, wherein the elongate body is comprised of plastic.

20. The system of claim 13, wherein the width is about two or more times greater than the thickness.

* * * * *